(No Model.)
L. A. & D. S. ROWE.
PIE AND CAKE RACK.
No. 320,173. Patented June 16, 1885.
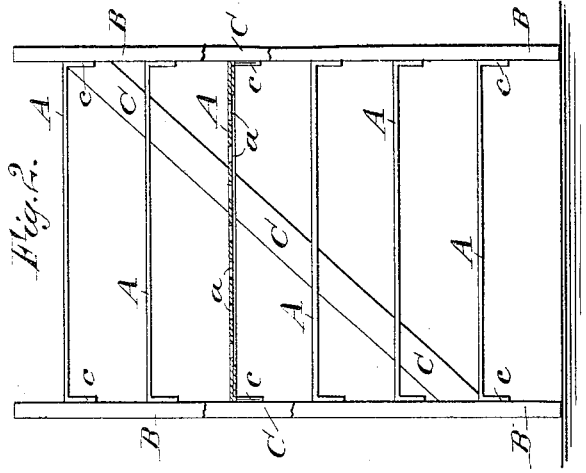
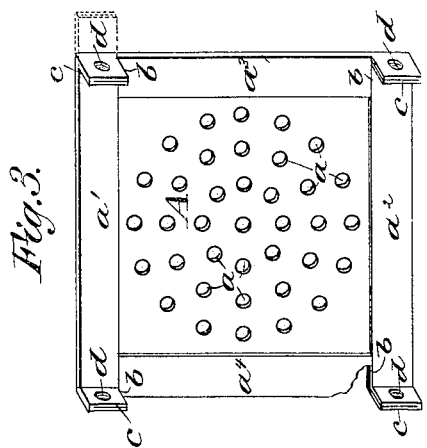
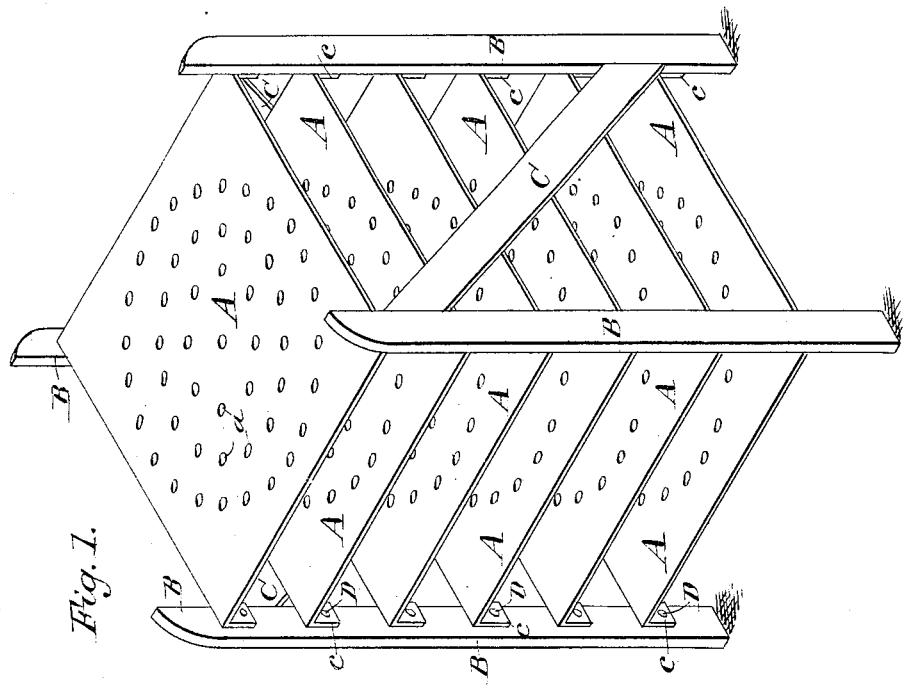
WITNESSES:
Otto Berger
C. Sedgwick
INVENTOR:
L. A. Rowe
D. S. Rowe
BY Munn & Co
ATTORNEYS.

United States Patent Office.

LYDIA A. ROWE AND DAVID S. ROWE, OF SPRINGFIELD, OHIO.

PIE AND CAKE RACK.

SPECIFICATION forming part of Letters Patent No. 320,173, dated June 16, 1885.

Application filed March 2, 1885. (No model.)

*To all whom it may concern:*

Be it known that we, LYDIA AUGUSTA ROWE and DAVID STEVENS ROWE, both of Springfield, in the county of Clark and State of Ohio, have invented a new and Improved Pie and Cake Rack, of which the following is a full, clear, and exact description.

The object of our invention is to facilitate the work of making and baking pies, cakes, &c., to economize the time and strength of those engaged in such work, and to save space in the kitchen or pantry in storing the said pies, cakes, &c.

The invention consists in a pie and cake rack comprising shelves made either perforated or imperforate and secured to a supporting-frame of upright and bracing slats.

The invention consists, also, in the particular construction of the rack-shelves and their attachments to the supporting-frame, all as hereinafter fully described and claimed.

Reference is to be had to the accompanying drawings, forming part of this specification, in which similar letters of reference indicate corresponding parts in all the figures.

Figure 1 is a perspective view of our improved pie and cake rack. Fig. 2 is a vertical sectional elevation of the rack, and Fig. 3 is an under side perspective view of one of the shelves of the rack.

The drawings represent a preferred form of the pie and cake rack, which consists of a series of shelves, A, secured in and to a frame consisting of four corner upright wood slats, B, united at three sides of the rack by diagonal brace-slats C, leaving one side of the rack open, to allow the pies and cakes to be placed on and removed from the shelves. We make the shelves A about ten inches square, finished, and from light sheets of tin or sheet metal, of suitable stiffness to support the pies and cakes, and we prefer to perforate the shelves, as at $a$, by a pressing, punching, or other process; but the shelves may be left imperforate, if desired.

In making the shelves A we take sheets of metal about eleven inches square and double the edges for about one-half inch all around under and against the main bodies of the sheets, and by slitting the bent portions $b\ b\ b\ b$, Fig. 3, there are provided the four stiffening lips or flanges $a'\ a^2\ a^3\ a^4$, which may or may not be soldered flatly to the sheets, and also the four corner lips, as shown in dotted lines, which are bent at right angles to the bodies of the plates to form the lugs $c\ c\ c\ c$, which are perforated, as at $d$, for the passage of the screws or nails D, which secure the shelves A firmly to the uprights B of the rack, as clearly indicated in Figs. 1 and 2.

It is evident that the attachment of the shelves A to the rack-frame gives the frame additional strength, whereby a light strong structure is produced, and one well adapted for its purpose. The rack will preferably be made about fifteen inches high, with six shelves placed about two and one-half inches apart; but the rack may be made of any preferred size and have any desired number of shelves.

Our improved rack will be found very useful to housekeepers and others when baking pies or cakes, as the baked pies may be transferred at once from their baking plates or dishes to the rack-shelves A, where the pies will be held in small space or compass, and need not be scattered over the kitchen or pantry in the usual manner, and in baking cakes, especially layer or jelly cakes, as the layers when properly baked may be laid on the perforated shelves A, and so as to keep them light while undergoing the cooling process, and when ready the cake may be built up layer after layer on the top shelf A, which is about the proper height to enable a person in standing position to work comfortably, and larger cakes may be laid on the top shelf A and kept there until ready for use, so that both pies and cake may at the same time be held in the rack.

By the use of our improvement kitchen-workers will save much storage-room in the pantry or closet, and will have less running back and forth to and from the pantry, thereby economizing their time and strength and facilitating household work, as will readily be understood.

Our invention is susceptible of various modification.

Having thus described our invention, what we claim as new, and desire to secure by Letters Patent, is—

1. A pie and cake rack comprising shelves A, secured to a frame consisting of upright corner posts or slats B, connected and braced at three sides of the rack by diagonal braces C, substantially as herein set forth.

2. A pie and cake rack comprising a supporting-frame of uprights B and brace-slats C, and a series of shelves, A, having the bent-under stiffening flange portions $a'$ $a^2$ $a^3$ $a^4$ and the lugs $c$, perforated at $d$, and fastened to the frame-slats B by screws or nails D, substantially as herein set forth.

3. A rack-shelf made of metal plates, and provided with the bent-under stiffening flange portions $a'$ $a^2$ $a^3$ $a^4$ and the perforated fastening-lugs $c$ $c$ $c$ $c$, substantially as herein set forth.

LYDIA A. ROWE.
DAVID S. ROWE.

Witnesses:
C. C. YEAZELL,
WILBER COLVIN,
WILLIAM LUPFER.